Nov. 14, 1950  E. R. JAGENBURG  2,530,063
MACHINE FOR PEELING PREPARED FRUITS
Filed Dec. 3, 1946  4 Sheets-Sheet 1

INVENTOR.
Eugene Robert Jagenburg.
BY
ATTORNEY.

Nov. 14, 1950  E. R. JAGENBURG  2,530,063
MACHINE FOR PEELING PREPARED FRUITS
Filed Dec. 3, 1946  4 Sheets-Sheet 3

INVENTOR.
Eugene Robert Jagenburg.
BY
Attorney.

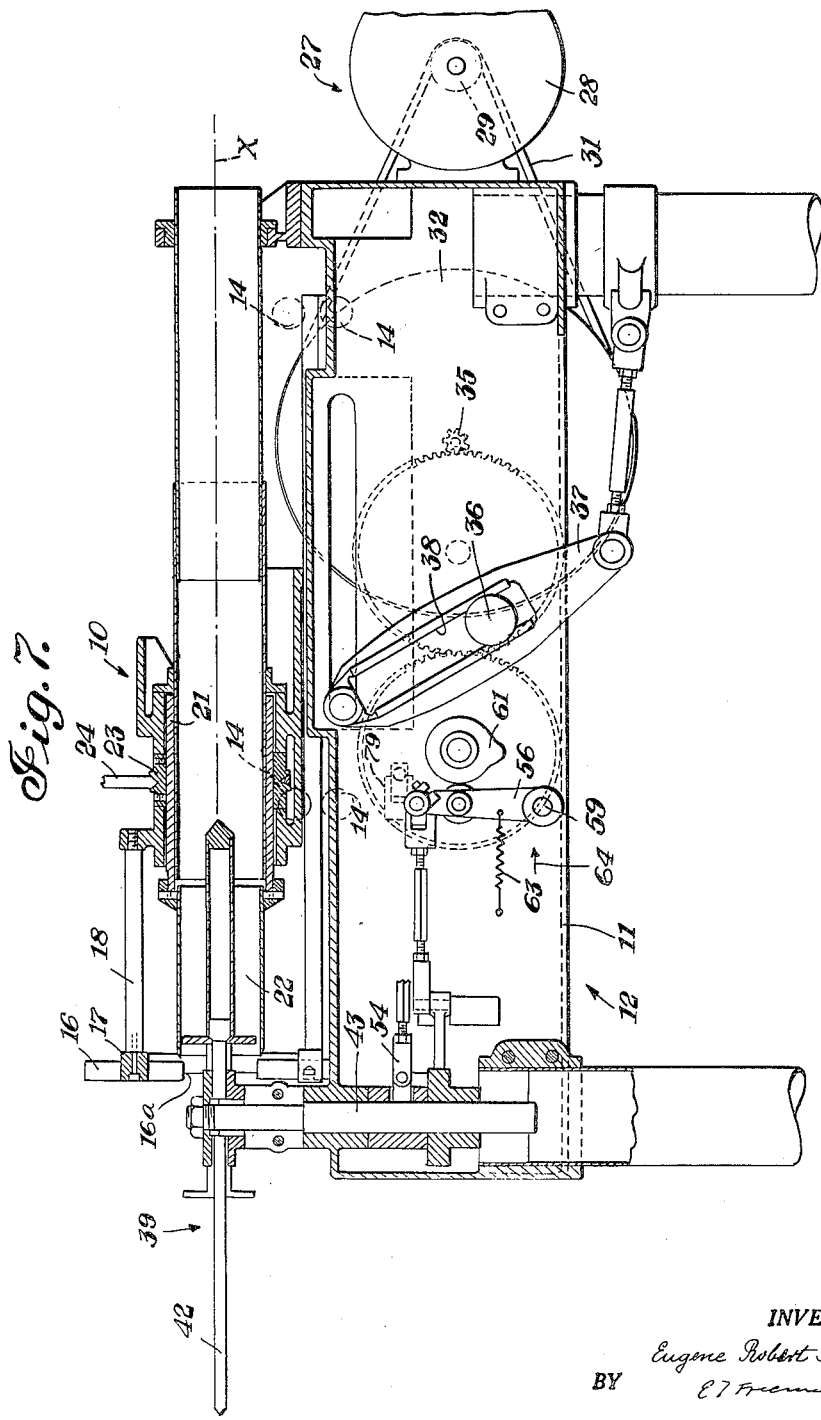

Patented Nov. 14, 1950

2,530,063

UNITED STATES PATENT OFFICE 2,530,063

MACHINE FOR PEELING PREPARED FRUITS

Eugene Robert Jagenburg, Brooklyn, N. Y., assignor to E. R. Jagenburg, Inc., Brooklyn, N. Y.

Application December 3, 1946, Serial No. 713,742

7 Claims. (Cl. 146—6)

The invention relates to fruit processing and relates more particularly to machines and methods for peeling fruits.

One of the principle objects of the invention is the provision of a machine which will continuously peel successive fruits.

Another object of the invention is the provision of such a machine which is easy to manipulate and to maintain and for the operation of which unskilled labor may be employed.

Another object is to provide a machine for peeling fruits which will automatically deposit the peeled fruit in a receptacle.

A further object of the invention is the provision of fruits peeling machinery which may be operated with a minimum of fruit waste.

A still further object is to provide methods of peeling fruits in a semi-automatic continuous operation.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel methods, construction, arrangement and combination of various devices, elements and parts, as set forth in the claims hereof, one embodiment of the same being illustrated in the accompanying drawings and described in the specification.

The present invention may be explained in connection with pineapples, but it will be understood that it is applicable equally well to other fruits and consequently, the following description should not be regarded in a sense limiting it to pineapples.

In order to prepare pineapples for canning or other preservation of the edible parts thereof, the non-edible end parts of the fruit have to be removed. Usually, the end portions of the fruit are cut off by a conventional operation and similarly the fruit is cored centrally, prior to peeling the fruit; fruits which have been freed from their opposite end portions and have been cored will be shortly termed "prepared fruits" as this specification proceeds.

In accordance with the present invention the prepared fruits are introduced in a fruit peeling machine where successive fruits are automatically peeled in a continuous operation and the peeled edible parts of the fruit expelled from the machine for deposit in a receptacle for further processing, such as slicing or freezing, dehydrating, etc.

For a fuller understanding of the nature and objects of the invention reference should be held to the following detailed description taken in connection with the accompanying drawings, in which.

Figure 2:
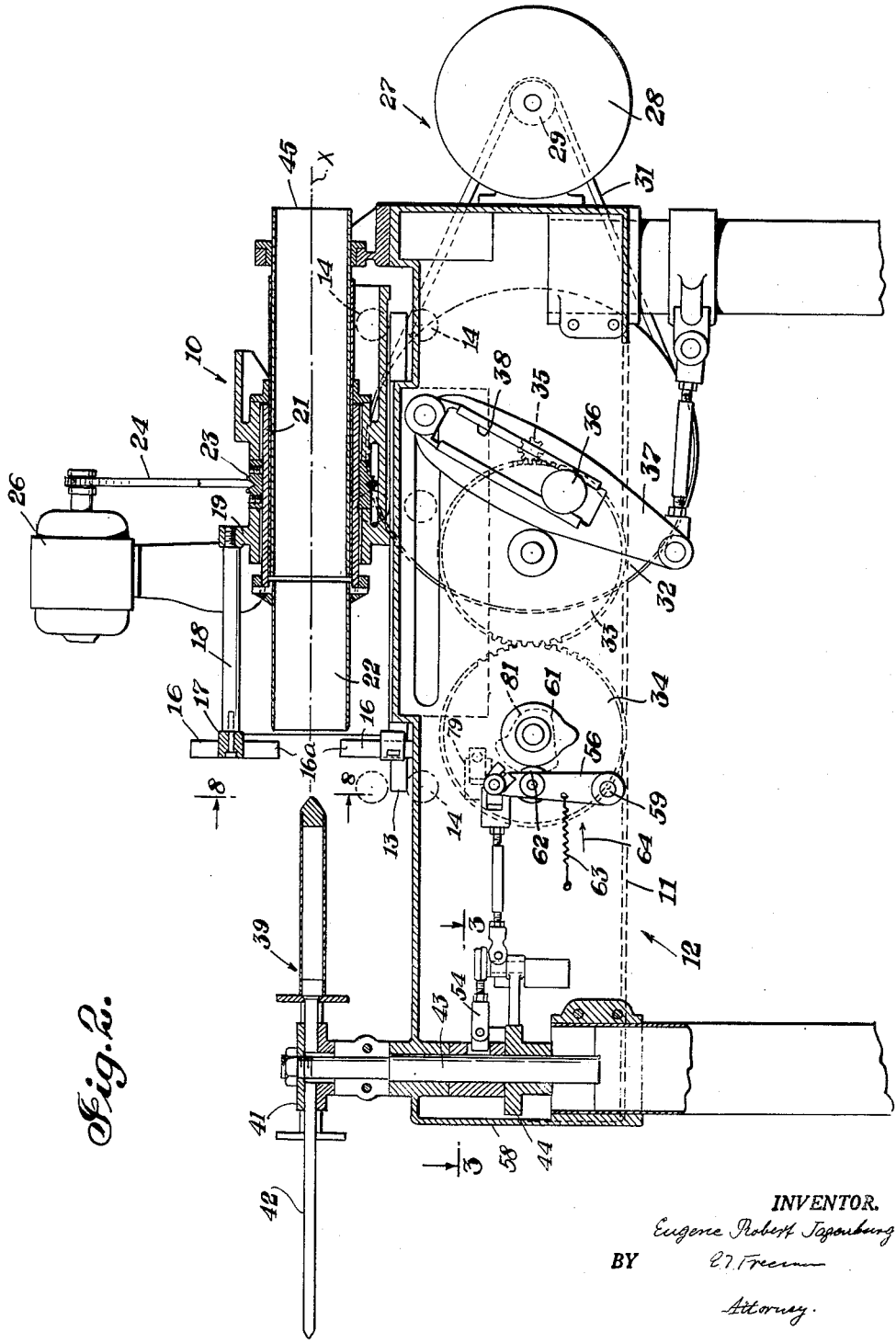
Fig. 2 is a sectional view taken along line 2—2 of Fig. 1.
Figure 3:
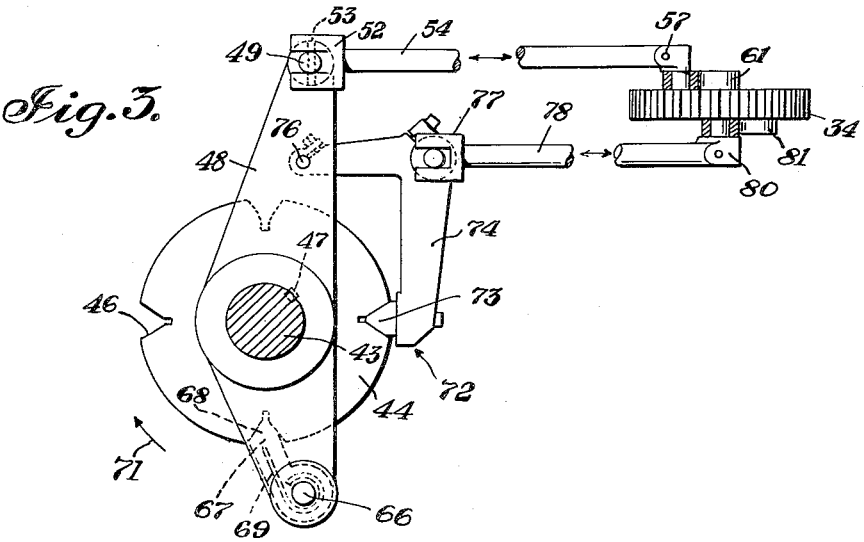
Figure 8:
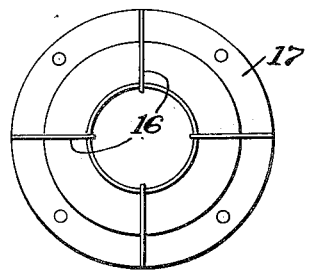

Fig. 3 is a sectional view on a partly enlarged scale taken along line 3—3 of Fig. 2, Fig. 4 is a prospective view of a latch carrying a spring, Fig. 5 is a prospective view of a bifurcated element, Fig. 6 is a prospective view of an insert for the element shown in Fig. 5, Fig. 7 is a sectional view similar to Fig. 2 but showing some parts in final position after completion of an operating movement, and Fig. 8 is an elevational front view of a portion of the machine as seen in direction 8—8 of Fig. 2.

A cutting and peeling head 10 is mounted on a longitudinal frame 11 of a fruit peeling machine, generally designated 12; this head 10 is movable longitudinally on said frame 11 between two extreme positions, one a rest position being shown in Fig. 2 and the other extreme cooperating position at the end of the operating stroke being illustrated in Fig. 7.

Head 10 is reciprocably slidable by means of a base 13 in the direction of its median axis X which base is guided between oppositely arranged adjacent guiding rollers 14 mounted on frame 11. Head 10 consists of a front and a rear portion; the front portion comprises four angularly equally spaced knives 16 (Fig. 8) which are radially disposed around and secured on a knife holding ring 17, constituting the front portion of head 10; ring 17 is connected to the rear portion of head 10 by means of spacing rods 18.

These rods 18 are fastened to a body portion or sleeve 19 of head 10 which is stationary with respect to rotation, but shiftable along with the entire head 10. In the inner space of body portion 19 there is located a freely rotatable tubular portion 21 which carries a peeling cutter 22. The frontal contour of said peeling cutter 22 is disposed adjacent but slightly behind knives 16; these knives 16 project with their inner ends 16a toward the center of head 10 for a distance slightly greater and are therefore nearer the center than the periphery of the cylindrical peeling cutter 22; the knives are radially adjustable in relation to the median axis X of head 10.

A pulley 23 is rigidly fastened to rotatable portion 21 and receives a rotating impulse from a belt 24 which is driven by a motor 26. This motor 26 is mounted on body portion 19 and is shiftable together therewith, so that the rotatable portion 21 may be turned by said motor 26 at all times irrespective of whether head 10 is at rest or being shifted.

In order to carry out the shifting of head 10 between its two extreme operating positions, a shifting drive, generally designated 27 is provided. A shift drive motor 28 is connected to said frame 11 and carries a pulley 29; pulley 29 drives an endless belt 31 which, in turn, transmits the driving energy to a large pulley 32 which is rotatably secured on frame 11.

Large pulley 32 coaxially carries a pinion 35 which is in mesh with a gear 33 which, in turn, drives a second gear 34. On said first gear 33 a bolt 36 is secured and projects axially therefrom. Said bolt 36 coacts with a slotted driving crank 37 and is slidably arranged in the slot 38 thereof, thereby translating the rotating movement of said gear 33 into a swinging movement of said driving crank 37.

Crank 37 is connected with its lower end to frame 11 and is fastened with its upper end to a downward projection of head 10. Thus, during one complete turn of gear 33, head 10 will be shifted frontwardly and rearwardly, thereby completing an entire shifting cycle.

A multi-fruit carrier 39 is rotatably mounted near the front of machine 12 on frame 11; it comprises a cross-shape carrying element 41 which consists of four radially arranged pins 42, each capable of receiving and holding a cored fruit, for instance a pineapple. Fruit carrier 39 is rotatable around a vertical axis in such a manner that one fruit at a time may be placed opposite head 10.

In order to peel the fruits, the same are mounted on pins 42 and the particular pin to be operated upon is turned in a manner described below and shown in Fig. 2 into a position opposite head 10 and in axial alignment with its median axis X.

After the peeling of a fruit, shaft 43 and therewith cross-shaped element 41 is rotated to bring another pin 42 into axial alignment with head 10.

The peeled fruit will be temporarily held in the interior of head 10, will be advanced through the same by subsequently peeled fruits and finally discharged rearwardly from head 10 at 45.

Pins 42 and the peeling cutter 22 are made interchangeable in conformity with the size of the fruits to be peeled.

Figure 1:
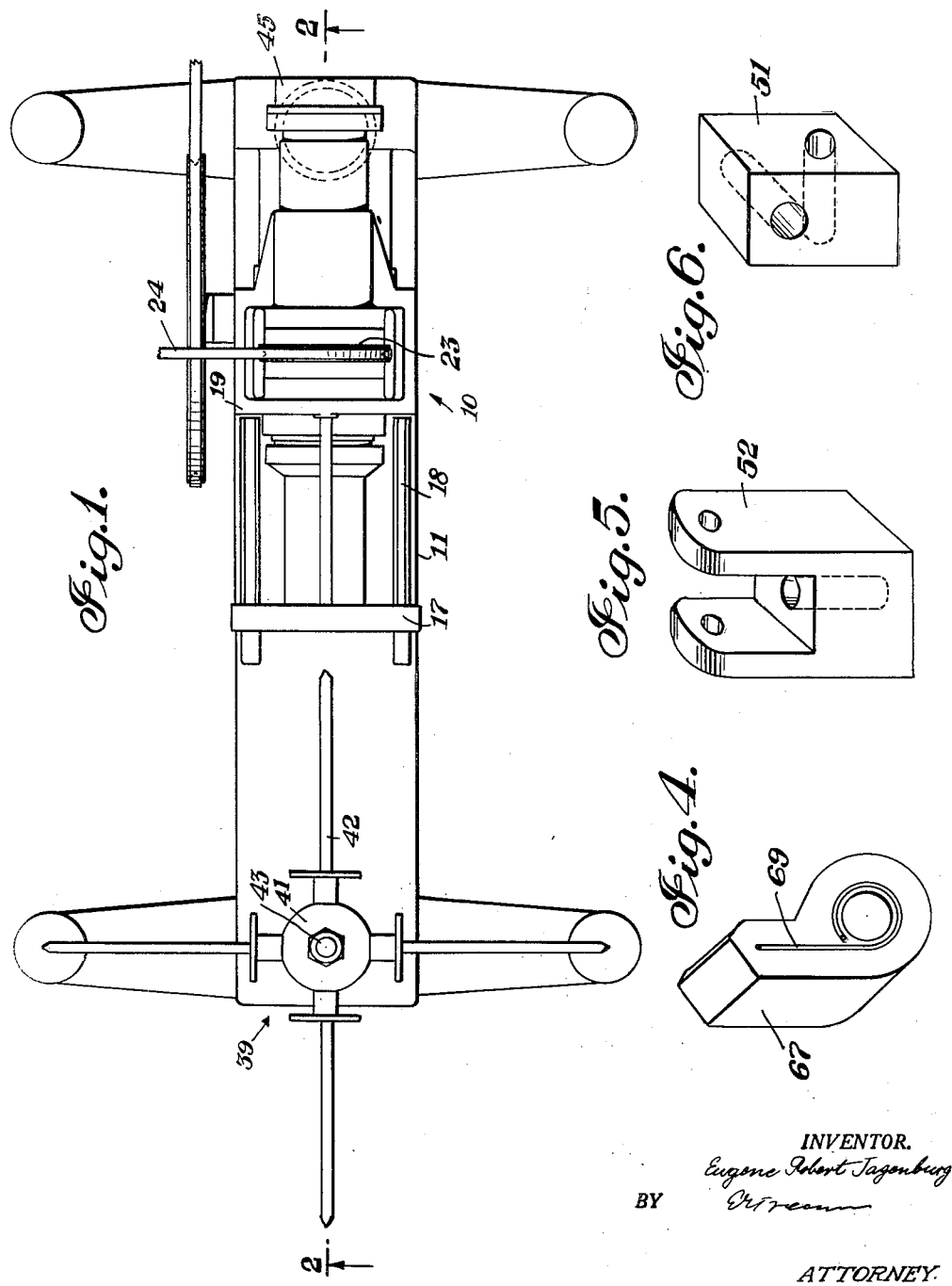
Fig. 1 is a top view of a machine constructed in accordance with the invention.

Cross-shaped head 41 (Fig. 1, 2) is mounted on vertical shaft 43 which carries several elements adapted to set the shaft in rotation when desired and holding it immovable at times.

A flange 44 (Fig. 3) is mounted on shaft 43; it is provided with a plurality of peripherally spaced notches 46, said flange being secured to shaft 43 by a conventional key 47. Flange 44 serves as a time to time rotative propulsion and stopping means for fruit carrier 39.

In order to stepwise rotate flange 44 and thereby fruit carrier 39, a lever 48 is provided above flange 44 which is mounted on shaft 43 and swingable thereon. At one end of lever 48 a projection 49 is secured which carries a cube-shaped insertion element 51 (Fig. 6). A bifurcated element 52 (Fig. 5) is swingably secured to said cube-shaped element 51 by means of a pin 53, and is carried on an end of a rod 54, the other end of which is joined by a universal joint to an oscillating lever 56 (Fig. 2) at the upper end 57 thereof. Oscillating lever 56 is pivoted at its other end 59 to frame 11.

A cam 61 is rigidly secured to gear 34 and rotated thereby; a portion 62 of oscillating lever 56 acts as a cam follower for said cam 61. A pressure spring 63 is mounted between said frame 11 and said oscillating lever 56 and bears upon the latter in a direction indicated by an arrow 64.

During the rotation of gear 34, cam 61 will move oscillating lever 56 in one direction and release it thereafter, whereupon spring 63 will return lever 56 to its initial position. The oscillations of lever 56 are transmitted to rod 54 and thereby to lever 48 where the oscillating energy is translated into a back-and-forth swinging movement of lever 48, by means of the universal joint constituted by bifurcated element 52, cube-shaped element 51, which is inserted in the bifurcation of element 52, and the pins 53 and 49 respectively.

On its other end lever 48 carries on a pivot 66 (Fig. 3) a latch 67 which is disposed on the underside of lever 48 and adjacent the periphery of flange 44 and capable of engaging notches 46 thereof with its front end 68. A spiral spring 69 is fastened to latch 67 for returning the latch to an initial position.

The swinging motion of lever 488 which is brought about by the oscillation of rod 54 is imparted by latch 67 to flange 44 resulting in a unidirectional intermittent turning movement of flange 44. Latch 67 is so positioned that only the swinging in one direction of lever 48 is transmitted to flange 44, and the lever 48 idles during the return swinging movement.

The energy transmitting movement is indicated by arrow 71 (Fig. 3). At the end of the idling movement of the lever 48 the latch 67 will be pressed into engagement with a succeeding notch 46 by the power of spring 69. Thus, the continuous rotation of a gear 34 is translated into an intermittent rotational movement of shaft 34 and thereby of fruit carrier 39.

In order to arrest the rotational movement of shaft 43 during the idling swinging motion of lever 48, stop means 72 are provided comprising a wedge 73 which is carried at the end of one shank of an L-shaped element 74. This L-shaped element 74 is pivoted at 76 with the end of its other shank to frame 11 and carries near the juncture of its arms a universal joint 77 similar to that carried by lever 48. A rod 78 is connected to universal joint 77 and transmits oscillating energy thereto similar to the previously disclosed rod 54. Rod 78 is joined in such a manner that it may rotate in all directions relative to an upper end 80 of a second oscillating lever 79 which again is similar to the previously disclosed oscillating lever 56 and is arranged adjacent the same but oppositely thereto with respect to gear 34 (see Fig. 3).

Gear 34 carries a second cam 81 which is opposite with relation to said cam 61 and which cooperates with oscillating lever 79 to transmit an intermittent oscillating movement to L-shaped element 74.

Cams 61 and 81 are so positioned on gear 34 and are so shaped that during the flange turning movement of lever 48 wedge 73 will be disengaged from flange 44 and during the idling movement of the lever 48 wedge 73 will be in engagement with a notch 46 of flange 44, thereby providing effective control of the intermittent rotation of flange 44.

Cams 61 and 81 are furthermore so positioned on the gear 34 that the wedge 73 will effectively hold flange 44 in standstill during the forward shifting movement of cutting head 10 and the turning movement will take place only in the short time interval when cutting head 10 is in or near its rest position (Fig. 2).

Thereby a fruit held by said fruit carrier 39 will be kept rigidly in front of cutting head 10 during the cutting operation and the subsequent fruit will only be brought before the head 10 after the cutting head has been retracted and no dangerous interference between the fruit carrier and the cutting head exists.

Referring now particularly to Fig. 8, the knives 16 which are located before the peeling cutter 22 will, during the cutting operation first make longitudinally parallel incisions into the peels of the fruit, and the peeling cutter 22 will subsequently peel the fruit by its rotational movement.

Cutting knives 16 serve a double purpose. They make incisions dividing the peel in sections for facilitating the subsequent peeling and at the same time they prevent a rotational accidental movement of the fruit around the pin 42 when the peeling cutter 22 engages the fruit. Knives 16 make incisions into the fruit which are deeper than the deepest point to which the peeling cutter 22 cuts into the fruit. This is brought about by the positioning of the knives 16 which extend radially further towards the center than the periphery of said cutter 22, as has been stated before.

The operation of the above described cutting machine is as follows.

Both motors 26 and 27 are started by the operator whereby cutting head will be shifted back and forth in an oscillating movement and the peeling cutter 22 be continuously rotated. At the same time the fruit carrier 39 will be rotated intermittently in a unidirectional movement by means of cams 61 and 81 and their associated mechanism transmitting oscillating energy to the shaft 43 and translating it into a rotational movement of the same.

Fruits, such as pineapples which have been cored and the ends cut off are continuously mounted by the operator onto said fruit carrying pins 42 and at predetermined time intervals one fruit at the time will automatically be brought into alignment with head 10 and the fruit will thus be peeled. After the peeling operation, the cutting head 10 will be retracted and carry on its inside the peeled fruit, and the next fruit carried by the succeeding pin 42 will be automatically brought into alignment with the cutting head 10. During the subsequent peeling operation, the previously peeled fruit will be pressed rearwardly on the interior of said head 10 and finally discharged at the rear end 45 thereof, where it may fall into a removable container or otherwise disposed of for a subsequent slicing or other fruit preparing operations.

It will be apparent to those skilled in the art that the novel principles of the invention disclosed herein in connection with a specific exemplification thereof will suggest various other modifications and applications of the same. It is accordingly desired that in construing the breadth of the appended claims they shall not be limited to the specific exemplification of the invention described herein.

Having thus described the invention, what I claim is new and desire to be secured by Letters Patent is as follows:

1. In a machine for peeling prepared fruits such as pineapples a longitudinal frame, a cutting and peeling head longitudinally reciprocable on said frame between two extreme operating positions, said head being composed of a front and of a rear portion, a ring on said front portion, a plurality of radially disposed adjustable knives in said ring, a rotatable tubular peeler in said rear portion, a circular body portion, surrounding said peeler, said body portion being stationary toward rotation but shiftable with said head, rods connecting said body portion and said ring and means carried by said body portion to rotate said peeler.

2. In a machine for peeling prepared fruits such as bored pineapples a longitudinal frame, a vertical shaft rotatably located in the one end of said frame, a multi-fruit carrier mounted at the upper upper end of said shaft, a cutting and peeling head located on said frame in adjacent relationship to said fruit carrier and being longitudinally reciprocable thereon between two extreme operating positions towards and away from said fruit carrier, said fruit carrier being provided with fruit holding means consisting substantially of a plurality of radial pins capable of receiving and supporting the cored fruits and each arranged to fit into the bore thereof and having a length sufficient to support a major portion of the fruit, and means carried by said frame to synchronise the rotation of said multi-fruit carrier and the longitudinal reciprocation of said head in such a manner that at the end of its advance movement towards said fruit carrier always one fruit is aligned with the direction of the head reciprocation.

3. In a machine for peeling prepared fruits such as bored pineapples a longitudinal frame, a vertical shaft rotatably located in the one end of said frame, a multi-fruit carrier mounted at the upper end of said shaft, a cutting and peeling head located on said frame in adjacent relationship to said fruit carrier and being longitudinally reciprocable thereon between two extreme operating positions towards and away from said fruit carrier, said carrier consisting of a cross-shaped head and a plurality of radial pins exchangeably inserted in said head and capable of receiving and supporting the cored fruits and each pin arranged to fit a bore of the fruit and having a length sufficient to support a major portion of the fruit, and means carried by said frame to synchronise the rotation of said multi-fruit carrier and the longitudinal reciprocation of said head in such a manner that at the end of its advance movement towards said fruit carrier one of the fruits is in axial alignment with said head.

4. Pin actuating means: for use in connection with a fruit peeling machine including a cutting and peeling head, a rotatable shaft, a fruit carrier connected to said shaft and having a plurality of pins, and a driving source: said pin actuating means comprising a flange on said fruit carrier bearing shaft, said flange having peripherally spaced notches in numerical analogy with said pins, a cam to be rotated by said driving source, a lever mounted on said shaft above said flange being back and forth swingable by said cam, a latch shaped in conformity with said notches pivotably fastened to one end of said lever, means actuated by said cam to swing the other end of said lever in one direction in such a manner as to force said latch stepwise into said notches to thereby stepwise rotate said shaft and to move said pins into axial alignment with said cutting and peeling head, but to release said latch into idling position upon the swinging of the lever into the opposite direction.

5. Pin actuating means: for use in connection with a fruit peeling machine including a cutting and peeling head, a rotatable shaft, a fruit carrier connected to said shaft and having a plurality of pins, and a driving source: said pin actuating means comprising a flange on said fruit carrier bearing shaft, said flange having peripherally spaced notches in numerical analogy with said pins, a cam rotated by said driving source, a lever mounted on said shaft above said flange being back and forth swingable by said cam, a latch shaped in conformity with said notches pivotably fastened to the one end of said lever, means actuated by said cam to swing the other end of said lever in one direction so as to force said latch stepwise into said notches, to thereby rotate said shaft and to move said pins into axial alignment with said cutting and peeling head, but to release said latch into idling position upon the swinging of the lever into the opposite direction and a spiral spring fastened to said latch to return the latter into its initial position.

6. Pin actuating means: for use in connection with a fruit peeling machine including a cutting and peeling head, a rotatable shaft, a fruit carrier connected to said shaft and having a plurality of pins, and a driving source: said pin actuating means comprising a flange on said fruit carrier bearing shaft, said flange having peripherally spaced notches in numerical analogy with said pins, a cam to be rotated by said driving source, a lever mounted on said shaft above said flange being back and forth swingable by said cam, a latch shaped in conformity with said notches pivotably fastened to the one end of said lever, means actuated by said cam to swing the other end of said lever in one direction so as to force said latch stepwise into said notches, to thereby rotate said shaft and to move said pins into axial alignment with said cutting and peeling head, but to release said latch into idling position upon the swinging of the lever into the opposite direction and means to arrest the fruit carrier bearing shaft during the idling period of the shaft rotating latch and to release the same prior to the arrival of said swingable lever into the flange actuating position.

7. Pin actuating means: for use in connection with a fruit peeling machine including a cutting and peeling head, a rotatable shaft, a fruit carrier connected to said shaft and having a plurality of pins, and a driving source: said pin actuating means comprising a flange on said fruit carrier bearing shaft, said flange having peripherally spaced notches in numerical analogy with said pins, a cam to be rotated by said driving source, a lever mounted on said shaft above said flange being back and forth swingable by said cam, a latch shaped in conformity with said notches pivotably fastened to the one end of said lever, means actuated by said cam to swing the other end of said lever in one direction so as to force said latch stepwise into said notches, to thereby rotate said shaft and to move said pins into axial alignment with said cutting and peeling head, but to release said latch into idling position upon the swinging of the lever into the opposite direction and means to arrest the fruit carrier bearing shaft during the idling period of the shaft rotating latch and to release the same prior to the arrival of said swingable lever into the flange actuating position, said means comprising a two-shank angular element pivoted at the end of one shank to said frame and being provided at the end of the other shank with a wedge shaped in accordance with said notches, a second cam rotated by said driving source adjacent to said first cam and means actuated by said second cam to press said wedge into said notches upon the release of said latch from said flange.

EUGENE ROBERT JAGENBURG.

REFERENCES CITED

The following references are of record in the file of this patent:

UNITED STATES PATENTS

| Number | Name | Date |
| --- | --- | --- |
| 334,173 | Kaiser | Jan. 12, 1886 |
| 547,349 | Haldkjar | Oct. 1, 1895 |
| 978,383 | Lister | Dec. 13, 1910 |
| 1,001,931 | Cookson | Aug. 29, 1911 |
| 1,405,058 | Moore | Jan. 31, 1922 |
| 1,484,446 | Felizianetti | Feb. 19, 1924 |
| 2,284,647 | Ewald | June 2, 1942 |
| 2,430,504 | Grills | Nov. 11, 1947 |